(12) United States Patent
Tabet et al.

(10) Patent No.: US 10,034,302 B2
(45) Date of Patent: Jul. 24, 2018

(54) TRANSMISSION OF UPLINK CONTROL INFORMATION FOR LINK-BUDGET-LIMITED DEVICES

(71) Applicant: Apple Inc., Cupertino, CA (US)

(72) Inventors: Tarik Tabet, Los Gatos, CA (US); Syed Aon Mujtaba, Santa Clara, CA (US); Moustafa M. Elsayed, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 96 days.

(21) Appl. No.: 14/795,750

(22) Filed: Jul. 9, 2015

(65) Prior Publication Data

US 2016/0014810 A1 Jan. 14, 2016

Related U.S. Application Data

(60) Provisional application No. 62/023,336, filed on Jul. 11, 2014.

(51) Int. Cl.
*H04W 74/00* (2009.01)
*H04B 7/06* (2006.01)
(Continued)

(52) U.S. Cl.
CPC ........ *H04W 74/004* (2013.01); *H04B 7/0626* (2013.01); *H04L 1/18* (2013.01);
(Continued)

(58) Field of Classification Search
None
See application file for complete search history.

(56) References Cited

U.S. PATENT DOCUMENTS

2006/0285481 A1* 12/2006 Lane .............. G06Q 50/22
370/208
2007/0201397 A1* 8/2007 Zhang .............. H04L 47/12
370/329
(Continued)

OTHER PUBLICATIONS

Office Action for ROC (Taiwan) Patent Application No. 104122621, dated Jul. 25, 2016, pp. 1-22.
(Continued)

*Primary Examiner* — Chirag Shah
*Assistant Examiner* — Amar Persaud
(74) *Attorney, Agent, or Firm* — Meyertons Hood Kivlin Kowert & Goetzel, P.C.; Jeffrey C. Hood

(57) ABSTRACT

Mechanisms are disclosed for improved transmission of uplink control information by a user equipment (UE) that is link budget limited. In one embodiment, the UE transmits a message to the base station indicating that the UE is link budget limited. In response to the message, the base station sends an uplink grant to the UE, enabling the UE to transmit uplink control information on the physical uplink shared channel (PUSCH) instead of on the Physical Uplink Control Channel (PUCCH). In another embodiment, the base station sends an uplink grant to a link-budget-limited UE each time downlink traffic is transmitted to the UE, enabling the UE to send ACK/NACK feedback on the PUSCH instead of the PUCCH. In another embodiment, the UE transmits a scheduling request (SR) to the base station as part of a random access procedure, enabling the SR to be transmitted on the PUSCH instead of the PUCCH.

26 Claims, 13 Drawing Sheets

(51) Int. Cl.
    *H04L 1/18* (2006.01)
    *H04W 74/08* (2009.01)
    *H04W 72/12* (2009.01)
    *H04W 72/14* (2009.01)
    *H04L 1/16* (2006.01)

(52) U.S. Cl.
    CPC ... *H04W 72/1278* (2013.01); *H04W 74/0833* (2013.01); *H04L 1/1671* (2013.01); *H04L 1/1896* (2013.01); *H04W 72/14* (2013.01)

(56) References Cited

U.S. PATENT DOCUMENTS

| | | | |
|---|---|---|---|
| 2011/0096677 A1* | 4/2011 | Kim | H04W 52/146 370/252 |
| 2011/0096707 A1* | 4/2011 | McCoy | H04W 24/10 370/310 |
| 2011/0134884 A1* | 6/2011 | Shiizaki | H04W 74/0866 370/331 |
| 2012/0113849 A1* | 5/2012 | Luo | H04L 1/0025 370/252 |
| 2013/0022007 A1 | 1/2013 | Berggren et al. | |
| 2013/0028223 A1* | 1/2013 | Kim | H04L 5/0007 370/329 |
| 2013/0064131 A1* | 3/2013 | Kwon | H04L 5/0007 370/252 |
| 2013/0250924 A1 | 9/2013 | Chen et al. | |
| 2013/0265963 A1 | 10/2013 | Suzuki et al. | |
| 2013/0315185 A1 | 11/2013 | Kim et al. | |
| 2014/0071875 A1* | 3/2014 | Cai | H04L 1/18 370/311 |
| 2014/0086189 A1 | 3/2014 | Takeda et al. | |
| 2014/0192659 A1* | 7/2014 | Tian | H04W 72/0453 370/252 |
| 2014/0247790 A1* | 9/2014 | Vajapeyam | H04W 72/042 370/329 |
| 2014/0341195 A1* | 11/2014 | Yan | H04W 36/06 370/336 |
| 2015/0055602 A1* | 2/2015 | Jersenius | H04L 1/0026 370/329 |
| 2015/0063277 A1* | 3/2015 | Yamada | H04W 72/042 370/329 |
| 2015/0280945 A1* | 10/2015 | Tan | H04L 27/2615 375/267 |
| 2016/0021644 A1* | 1/2016 | Seo | H04L 1/1854 370/315 |
| 2016/0050058 A1* | 2/2016 | Aiba | H04L 1/0025 370/329 |
| 2016/0337064 A1* | 11/2016 | Park | H04L 1/1692 |

OTHER PUBLICATIONS

International Search Report & Written Opinion, Application No. PCT/US2015/039929, dated Oct. 19, 2015, 10 pages.

\* cited by examiner

950 transmit an uplink grant to a user equipment (UE), wherein the first uplink grant is transmitted in response to an indication that the UE is link budget limited, wherein the UE is configured to transmit uplink control information on a physical uplink shared channel (PUSCH) in response to the first uplink grant  955 receive the uplink control information on the PUSCH
960

1100

--- in response to an indication that a UE is link budget limited, the base station performs operations including the following operations:   *1110*

--- in response to determining that the base station has downlink traffic data to be transmitted to the UE, generate an uplink grant for the UE   *1115*

--- transmit at least a portion of the downlink traffic data to the UE   *1120*

--- transmit the uplink grant to the UE   *1125*

--- receive an uplink signal including a PUSCH from the UE, wherein the PUSCH includes uplink control information   *1130*

```
┌─────────────────────────────────────────────────────────────────────┐
│ performing a set of operations by a UE, wherein a base station is   │
│ configured to generate an uplink grant for the UE in response to (a) an │
│ indication that the UE is link budget limited and (b) an indication that the │
│ base station has downlink traffic data to be transmitted to the UE, │
│ wherein the set of operations performed by the UE includes:   1210  │
└─────────────────────────────────────────────────────────────────────┘
    ┌─────────────────────────────────────────────────────────────┐
    │  receiving at least a portion of the downlink traffic data from the │
    │                    base station    1215                     │
    └─────────────────────────────────────────────────────────────┘
    ┌─────────────────────────────────────────────────────────────┐
    │     receiving the uplink grant from the base station   1220 │
    └─────────────────────────────────────────────────────────────┘
    ┌─────────────────────────────────────────────────────────────┐
    │  in response to receiving the uplink grant, transmitting a physical │
    │  uplink shared channel (PUSCH) to the base station, wherein the │
    │       PUSCH includes uplink control information    1225     │
    └─────────────────────────────────────────────────────────────┘
```

FIG. 12

TRANSMISSION OF UPLINK CONTROL INFORMATION FOR LINK-BUDGET-LIMITED DEVICES

PRIORITY CLAIM INFORMATION

This application claims priority to U.S. Provisional Application No. 62/023,336, filed Jul. 11, 2014, titled "Transmission of Uplink Control Information for Link Budget Constrained Devices", by Tarik Tabet, Syed Aon Mujtaba and Moustafa M. Elsayed. The above identified application is hereby incorporated by reference in its entirety as though fully and completely set forth herein.

FIELD

This application relates to wireless communication, and more particularly, to mechanisms for improved transmission and decoding of uplink control information in radio access technologies (RATs) such as LTE.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, etc.

In cellular radio access technologies (RATs) such as LTE, various uplink and downlink channels are used to communicate between the base station and the UE. For example, LTE uses various channels so that data can be transported across the LTE radio interface. These channels are used to segregate the different types of data and allow them to be transported across the radio access network in an orderly fashion. The different channels effectively provide interfaces to the higher layers within the LTE protocol structure and enable an orderly and defined segregation of the data.

There are three categories or types of LTE data channels as follows.

Physical channels: These are transmission channels that carry user data and control messages.

Transport channels: The transport channels offer information transfer to Medium Access Control (MAC) and higher layers.

Logical channels: Provide services for the Medium Access Control (MAC) layer within the LTE protocol structure.

LTE defines a number of downlink physical channels to carry information received from the MAC and higher layers. The LTE downlink comprises a relatively small number of channels, with the two key channels being the Physical Downlink Shared Channel (PDSCH) and the Physical Downlink Control Channel (PDCCH). The LTE uplink comprises a Physical Uplink Control Channel (PUCCH) and a Physical Uplink Shared Channel (PUSCH). The PUSCH is the channel that carries user data and signaling messages. The PUSCH is the main data-bearing uplink channel which is allocated to users on a dynamic and opportunistic basis, usually in the form of grants provided from the base station to the respective UEs.

In radio access technologies (RATs) such as LTE, the PUCCH (Physical Uplink Control Channel) is used to carry uplink control information. PUCCH resources are configured through RRC (Radio Resource Control).

The PUCCH is mapped to a control channel resource in the uplink, where the control channel resource is defined by a code and two resource blocks. The two resource blocks are consecutive in time, and hop between the band edges. Thus, as shown in FIG. 1, the PUCCH comprises two resource blocks (RBs) that "hop" at the two edges of the uplink bandwidth from one slot to the next.

When time synchronization is present, the PUCCH is used to convey the following information to the eNB:
1) a Scheduling Request (SR);
2) HARQ Acknowledge or HARQ Negative Acknowledge (ACK/NACK) to positively or negatively acknowledge a previous downlink transmission on the PDSCH; and
3) Channel State Information (CSI), e.g., channel quality indicator(s) and/or precoding matrix indicator(s) and/or rank indicator(s).

The scheduling request is a request by the UE for the scheduling of radio resources for uplink transmission by the UE. (The base station is responsible for scheduling.) The ACK/NACK is the HARQ feedback in response to a downlink data transmission, and comprises a single ACK/NAK bit per HARQ process. (HARQ is an acronym for Hybrid Automatic Repeat Request.) The CSI informs the base station (eNB) about the conditions on the current channel as seen by the UE.

The PUCCH contains a limited number of bits and does not support channel coding. The PUCCH is encoded by using ZC sequences. (ZC is an acronym for "Zadoff-chu".) In situations where the user equipment (UE) device is link budget limited, current PUCCH specifications do not allow any flexibility in order to improve the performance of decoding of uplink control information transmitted via the PUCCH. (A UE device may be link budget limited, e.g., if the device is equipped with a poorly performing antenna system and/or if the device is located in an area where the downlink signal is weak, e.g., far from the base station or in the basement of a building.) For example, in the physical downlink control channel (PDCCH), the eNB can increase the AL (aggregation level) of information transmitted on the PDCCH for improved decoding at the UE. As another example, in the physical downlink shared channel (PDSCH), the eNB can decrease the coding rate of information by spreading the information across a greater number of resource blocks (RBs) in the PDSCH. However, there is currently no mechanism for improving the decoding of the uplink control information transmitted via the PUCCH.

Furthermore, according to the LTE specifications, a UE may be configured so that, if an uplink grant is available, the UE transmits an a periodic CSI report on the granted resources in the PUSCH. The CSI information in the a periodic CSI report is channel coded with a fixed coding rate, and the encoded CSI is multiplexed with uplink traffic data on the PUSCH. However, a link-budget-limited UE may not have an available uplink grant when it needs to transmit uplink control information (UCI), and the fixed coding rate used for the UCI might not ensure successful decoding at the eNB.

Thus, there exists a need for improved mechanisms for transmitting uplink control information, i.e., mechanisms capable of improving the likelihood of successful decoding of the uplink control information by the base station.

SUMMARY

This patent discloses, among other things, embodiments of mechanisms that provide for improved decoding of uplink control information. The methods may be particularly useful for link-budget-limited devices.

In one set of embodiments, a method for transmitting uplink control information may include performing operations by a user equipment (UE), where the operations include (a) generating uplink control information for transmission to a base station; (b) receiving an uplink grant from the base station, wherein the uplink grant has been generated by the base station in response to an indication that the UE is link budget limited; and (c) in response to the uplink grant received from the base station, transmitting a physical uplink shared channel (PUSCH) to the base station, wherein the PUSCH includes the uplink control information. By transmitting the uplink control information on the PUSCH instead of the PUCCH, the UE may increase the likelihood that the base station will successfully decode the uplink control information. The uplink control information may include channel state information (CSI) and/or HARQ ACK/NACK, a scheduling request, etc.

In one set of embodiments, a method for receiving uplink control information may include performing operations by a base station, wherein the operations include: (a) transmitting an uplink grant to a user equipment (UE), wherein the uplink grant is transmitted in response to an indication that the UE is link budget limited, wherein the UE is configured to transmit uplink control information on a physical uplink shared channel (PUSCH) in response to the uplink grant; and (b) receiving the uplink control information on the PUSCH.

In one set of embodiments, a method for operating a user equipment (UE) may include the following operations.

The UE may generate a scheduling request for transmission to a base station, wherein the scheduling request represents a request for a scheduling of uplink resources for an uplink transmission by the UE.

The UE may transmit the scheduling request as part of a random access procedure.

In one set of embodiments, a method for operating a base station may include the following operations.

The base station may receive a scheduling request from a user equipment (UE) device, wherein said receiving the scheduling request includes receiving the scheduling request from a message of a random access procedure (RACH).

The base station may generate an uplink grant for the UE device in response to receiving the scheduling request.

The base station may transmit the uplink grant to the UE device.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 11 illustrates a method for operating a base station to enable a link-budget-limited UE device to transmit uplink control information on the PUSCH, according to some embodiments.

FIG. 12 illustrates a method for operating a user equipment (UE) device to improve transmission of uplink control information to a base station, according to some embodiments.

Figure 1:
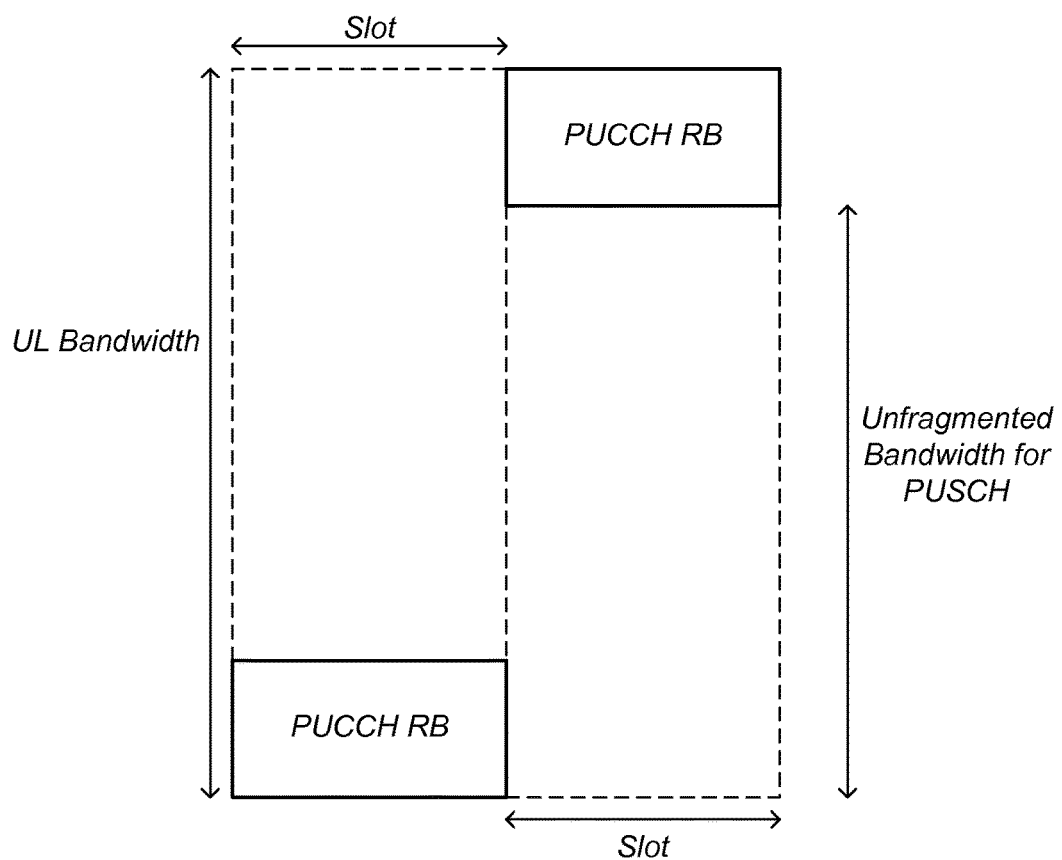
FIG. 1 illustrates the location of PUCCH resource blocks in a subframe according to the prior art.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which perform wireless communications. Examples of UE devices include mobile telephones or smart phones (e.g., iPhone™Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
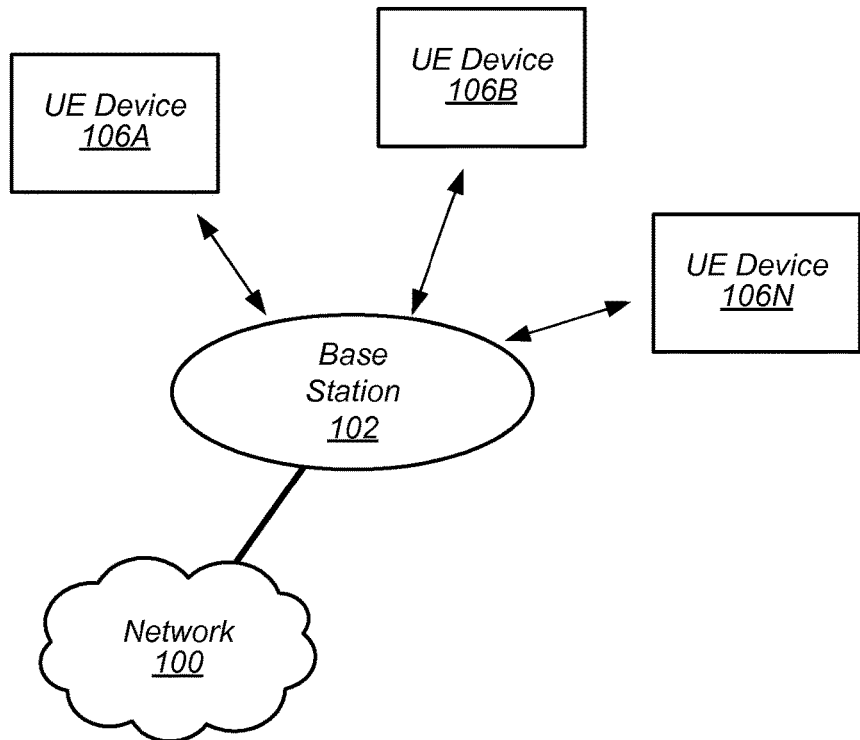
FIG. 2 illustrates an example of a wireless communication system, according to some embodiments.
Figure 3:
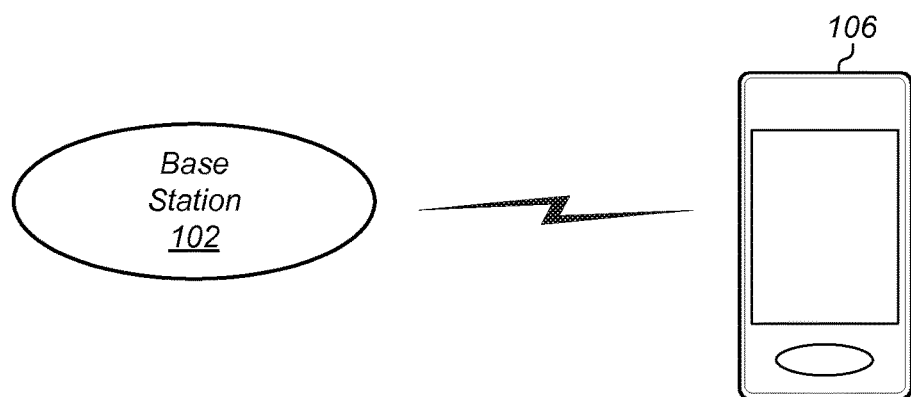
FIG. 3 illustrates a base station ("BS", or in the context of LTE, an "eNodeB" or "eNB") in wireless communication with a UE device, according to some embodiments.

FIGS. 2-3: Communication System

FIG. 2 illustrates a wireless communication system, according to some embodiments. It is noted that FIG. 2 represents one possibility among many, and that features of the present disclosure may be implemented in any of various systems, as desired.

As shown, the exemplary wireless communication system includes a base station 102A which communicates over a transmission medium with one or more wireless devices 106A, 106B, etc., through 106N. Wireless devices may be user devices, which may be referred to herein as "user equipment" (UE) or UE devices.

The base station 102 may be a base transceiver station (BTS) or cell site, and may include hardware that enables wireless communication with the UE devices 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and/or between the UE devices 106 and the network 100.

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and similar devices over a wide geographic area via one or more cellular communication technologies.

Thus, while base station 102 may presently represent a "serving cell" for wireless devices 106A-N as illustrated in FIG. 2, each UE device 106 may also be capable of receiving signals from one or more other cells (e.g., cells provided by other base stations), which may be referred to as "neighboring cells". Such cells may also be capable of facilitating communication between user devices and/or between user devices and the network 100.

Note that at least in some embodiments a UE device 106 may be capable of communicating using multiple wireless communication technologies. For example, a UE device 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication technologies (including more than two wireless communication technologies) are also possible. Likewise, in some instances a UE device 106 may be configured to communicate using only a single wireless communication technology.

FIG. 3 illustrates UE device 106 (e.g., one of the devices 106A through 106N) in communication with base station 102, according to some embodiments. The UE device 106 may have cellular communication capability and as defined above may be a device such as a mobile phone, a hand-held device, a computer or a tablet, or virtually any type of wireless device.

The UE device 106 may include a processor that is configured to execute program instructions stored in memory. The UE device 106 may perform any of the method embodiments described herein by executing such stored instructions. Alternatively, or in addition, the UE device 106 may include a programmable hardware element such as an FPGA (field-programmable gate array) that is configured to perform any of the method embodiments described herein, or any portion of any of the method embodiments described herein.

In some embodiments, the UE device 106 may be configured to communicate using any of multiple radio access technologies/wireless communication protocols. For example, the UE device 106 may be configured to communicate using one or more of GSM, UMTS, CDMA2000, LTE, LTE-A, WLAN/Wi-Fi, or GNSS. Other combinations of wireless communication technologies are also possible.

The UE device 106 may include one or more antennas for communicating using one or more wireless communication protocols or technologies. In one embodiment, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of LTE or 1×RTT (or LTE or GSM), and separate radios for communicating using each of Wi-Fi and Bluetooth. Other configurations are also possible.

Figure 4:
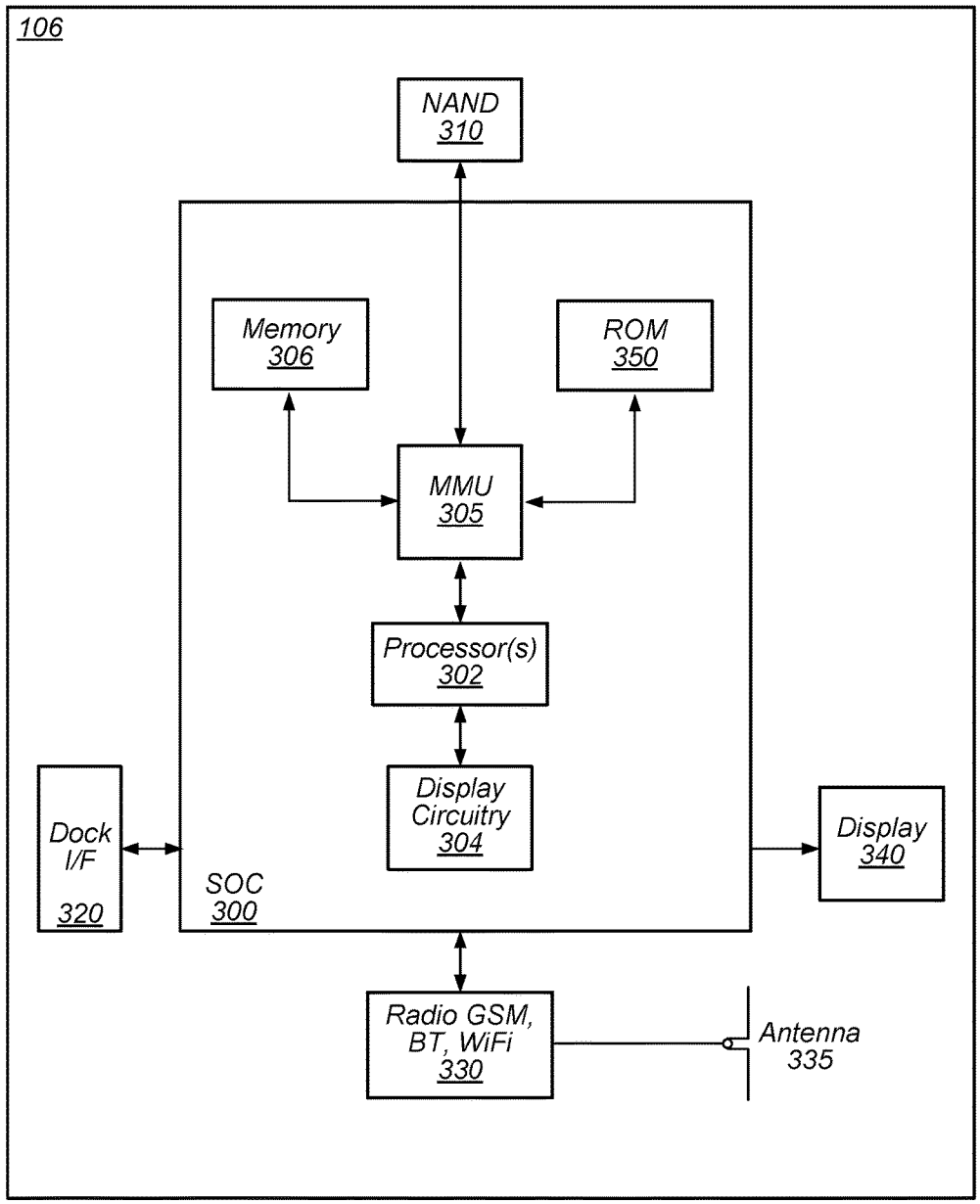
FIG. 4 is a block diagram of an exemplary UE device, according to some embodiments.

FIG. 4—Exemplary Block Diagram of a UE

FIG. 4 illustrates an exemplary block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 340. The processor(s) 302 may also be coupled to memory management unit (MMU) 305, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 340. The MMU 305 may be configured to perform memory protection and page table translation or set up. In some embodiments, the MMU 305 may be included as a portion of the processor(s) 302.

In the embodiment shown, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including NAND flash 310), a connector interface 320 (e.g., for coupling to the computer system), the display 340, and wireless communication circuitry (e.g., for LTE, CDMA2000, Bluetooth, WiFi, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE may be configured to communicate wirelessly using multiple wireless communication standards in some embodiments.

As described herein, the UE 106 may include hardware and software components for implementing a method for responding to enhanced paging according to embodiments of this disclosure.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 5:
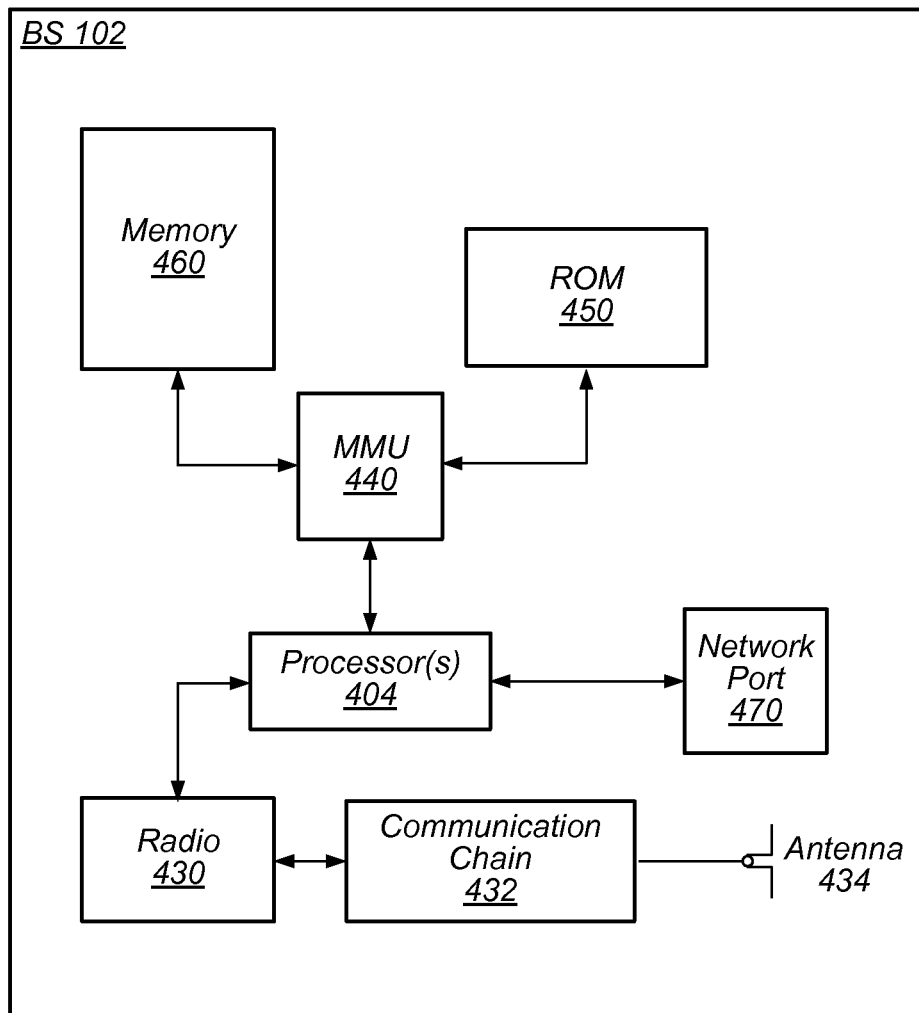
FIG. 5 is a block diagram for an exemplary base station, according to some embodiments.

FIG. 5—Base Station

FIG. 5 illustrates an exemplary block diagram of a base station 102, according to some embodiments. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices 106 serviced by the cellular service provider).

The base station 102 may include at least one antenna 434. The at least one antenna 434 may be configured to operate as a wireless transceiver and may be further configured to communicate with UE devices 106 via radio 430. The antenna 434 communicates with the radio 430 via communication chain 432. Communication chain 432 may include a receive chain, a transmit chain or both. The radio 430 may be configured to communicate via one or more RATs such as GSM, UMTS, LTE, WCDMA, CDMA2000, etc.

The processor(s) 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

Figure 6:
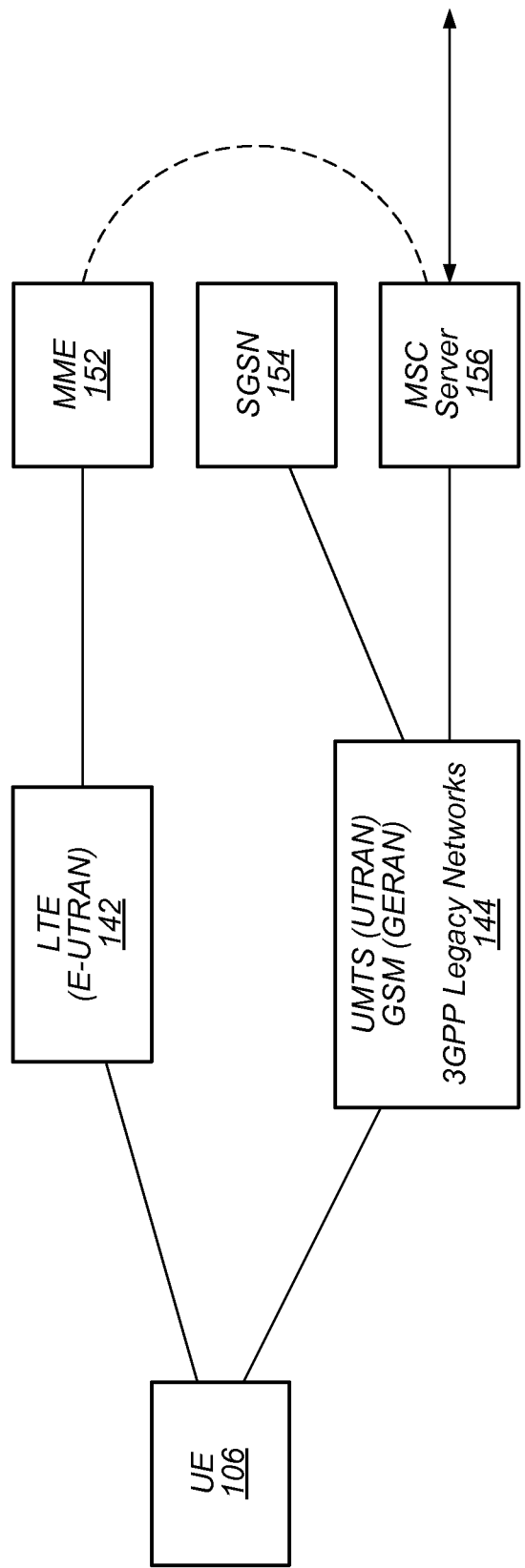
FIG. 6 is a block diagram of an exemplary cellular communication system including a UE which can communicate according to one or more RATs, according to some embodiments.

FIG. 6—Example Communication System

FIG. 6 illustrates an example of a communication system that may operate according to any of the methods described herein. As shown, FIG. 6 illustrates a simplified view of an example network architecture with parallel LTE and 2G/3G networks, according to some embodiments. The LTE network 142 and the legacy 2G/3G network 144 may co-exist in the same geographic area, wherein both networks reside between the mobile customer's User Equipment (UE) and a common core network. Each of the networks may include a respective base station for communicating with the UE 106. The common core network may comprise an MME (Mobility management Entity) 152, an SGSN (Serving GPRS Support Node) 154, and an MSC (Mobile Switching Center) Server 156. GPRS refers to the General Packet Radio Service, which is a packet-oriented mobile data service on 2G and 3G GSM (Global System for Mobile communications) networks.

Transmitting a Scheduling Request as Part of the RACH

Figure 7A:
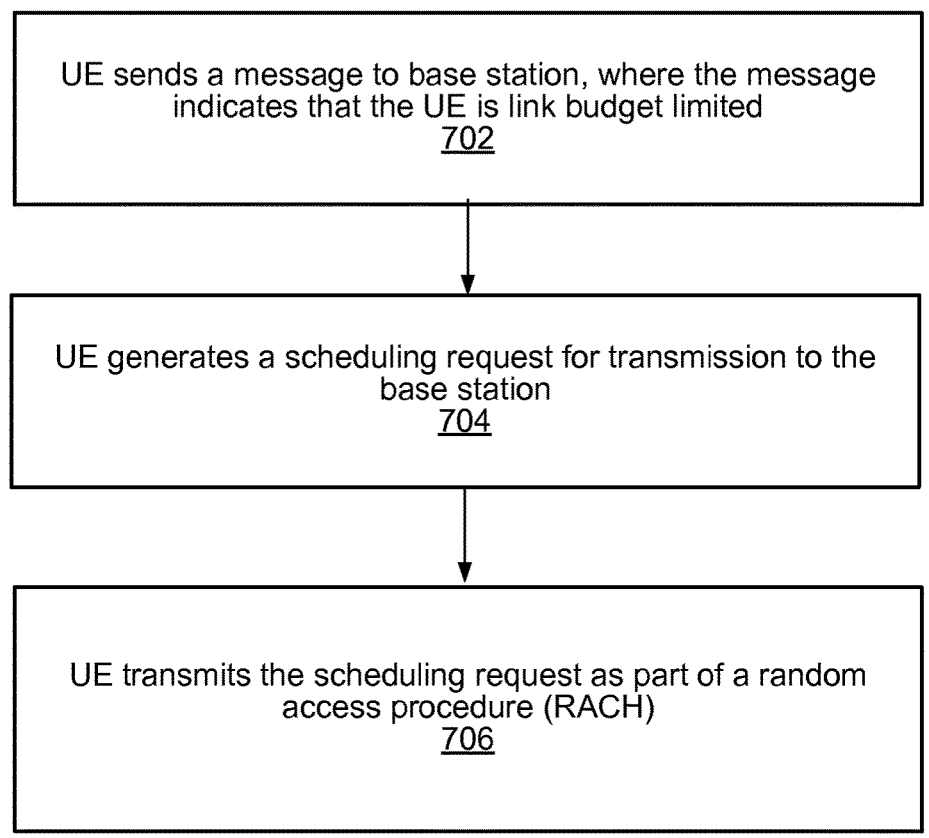
FIG. 7A illustrates a method for operating a user equipment to transmit a scheduling request as part of a random access procedure (RACH), according to some embodiments.

In one set of embodiments, a method 700 for UE transmission of a scheduling request (SR) may include the operations shown in FIG. 7A. (The method 700 may also include any subset of the features, elements and embodiments described above in connection with FIGS. 1-6 and described below in connection with FIGS. 7B-12.) The method 700 enables a UE to transmit the scheduling request on the PUSCH instead of the PUCCH. Channel coding may be applied to the scheduling request when transmitted in the PUSCH. Thus, the transmission of the scheduling request on the PUSCH is more reliable than transmission of this information on the PUCCH.

Except where dependencies are noted, the steps described below may occur in different orders than that shown, or concurrently. Further, various steps shown may be omitted, or other steps added, in various embodiments.

As shown at 702, the UE may send a message to the base station 106 indicating that the UE is link budget limited. The message may be interpreted as a message requesting that the UE be enabled to send a scheduling request (or scheduling requests) as part of the random access procedure. The message may also indicate that at least certain other uplink control information will be transmitted on PUSCH, rather than on the PUCCH. The message may take any of various forms, as desired.

The UE may determine that it is link budget limited in any of various ways, e.g., based on channel state information that the UE generates, based on received signal strength of the downlink signal, based on measurement of signal to interference-and-noise ratio of the downlink signal, based on number of HARQ retransmissions, based on the UE's knowledge of a hardware limitation, etc.

As shown at 704, the UE may generate a scheduling request for transmission to the base station. The scheduling request may represent a request for a scheduling of uplink resources for an uplink transmission by the UE. (The base station is responsible for scheduling.)

As shown at 706, the UE may transmit the scheduling request as part of a random access procedure (RACH). In particular, the portion of the RACH that contains the scheduling request is transmitted on the physical uplink shared data channel (PUSCH). Because the scheduling request is transmitted on the PUSCH instead of on the PUCCH, the scheduling request can be transmitted with greater probability of successful decode by the base station.

Channel coding may be applied to the scheduling request (e.g., as variously described in the sections below), and the resulting encoded bits may be included in the PUSCH. A coding rate used for the channel coding of the scheduling request may be controlled by the base station (or by the UE), to ensure successful decoding of the scheduling request. The coding rate may be configurable or dynamically adjustable.

The message sent by the UE at 702 may operate to notify the base station that future scheduling requests may arrive in UE-initiated attempts of the random access procedure. Thus, the base station may operate to extract scheduling requests from RACH messages sent by the UE. The UE can initiate a RACH any time it desires, and thus, the UE is not required to wait for an uplink grant from the base station before sending a scheduling request via the PUSCH.

If the UE later determines that it is no longer link budget limited, the UE may transmit a message to the base station indicating that it is not link budget limited, i.e., that it should no longer be considered as link budget limited. After sending this message, the UE may revert back to normal operation of transmitting scheduling requests to the base station in the physical uplink control channel (PUCCH).

In some embodiments, the scheduling request is transmitted in a third message (MSG3) of the random access procedure. As defined in the LTE specifications, MSG3 of the RACH is transmitted on the PUSCH.

In some embodiments, the scheduling request is transmitted in MSG3 with a coding rate that is determined by the base station to ensure successful decode of the scheduling request by the base station. Alternatively, MSG3 can be scheduled to be repeated in time through an increased number of HARQ retransmissions, with or without TTI-B. (TTI-B is an acronym for TTI Bundling.)

Figure 7B:
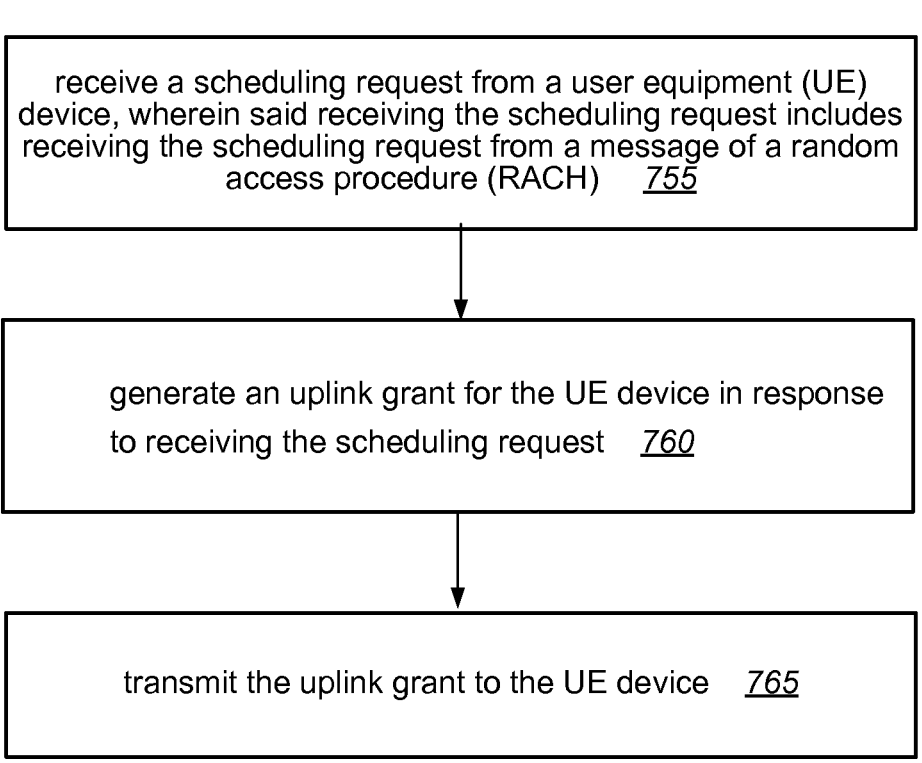
FIG. 7B illustrates a method for operating a base station to receive a scheduling request as part of a random access procedure, according to some embodiments.

In one set of embodiments, a method 750 for receiving a scheduling request (SR) may include the operations shown in FIG. 7B. (The method 750 may also include any subset of the features, elements and embodiments described above in connection with FIGS. 1-7A and described below in connection with FIGS. 8-12.) The method 750 may be performed by a processing element of a base station, wherein the processing element is coupled to one or more radios, e.g., as variously described above.

At 755, the base station may receive a scheduling request from a user equipment (UE) device. The action of receiving the scheduling request may include receiving the scheduling request from a message of a random access procedure (RACH). See, e.g., the discussion of FIG. 8 below. The scheduling request represents a request by the UE for uplink resources to be granted to the UE for uplink transmission, e.g., uplink resource of the PUSCH.

At 760, the base station may generate an uplink grant for the UE device in response to receiving the scheduling request. The uplink grant may identify or specify time-frequency resources granted to the UE for uplink transmission on the PUSCH.

At 765, the base station may transmit the uplink grant to the UE device. The uplink grant may be transmitted as part of a downlink signal (e.g., a downlink OFDM signal.) The uplink grant may be included in a PDCCH of the downlink signal, or in a e-PDCCH of the downlink signal.

In some embodiments, the RACH message is a third message (MSG3) of the RACH, wherein MSG3 is received from a Physical Uplink Shared Channel (PUSCH) of an uplink signal. See, e.g., the discussion of FIG. 8.

In some embodiments, the action of receiving the scheduling request comprises decoding the scheduling request from MSG3 according to the channel coding algorithm used by the UE to encode the scheduling request.

In some embodiments, the operations also include: prior to said RACH, receiving a status message from the UE, wherein the status message indicates that UE is link budget limited, wherein said receiving the scheduling request from the RACH message is performed in response said receiving the status message.

Random Access Procedure

Figure 8:
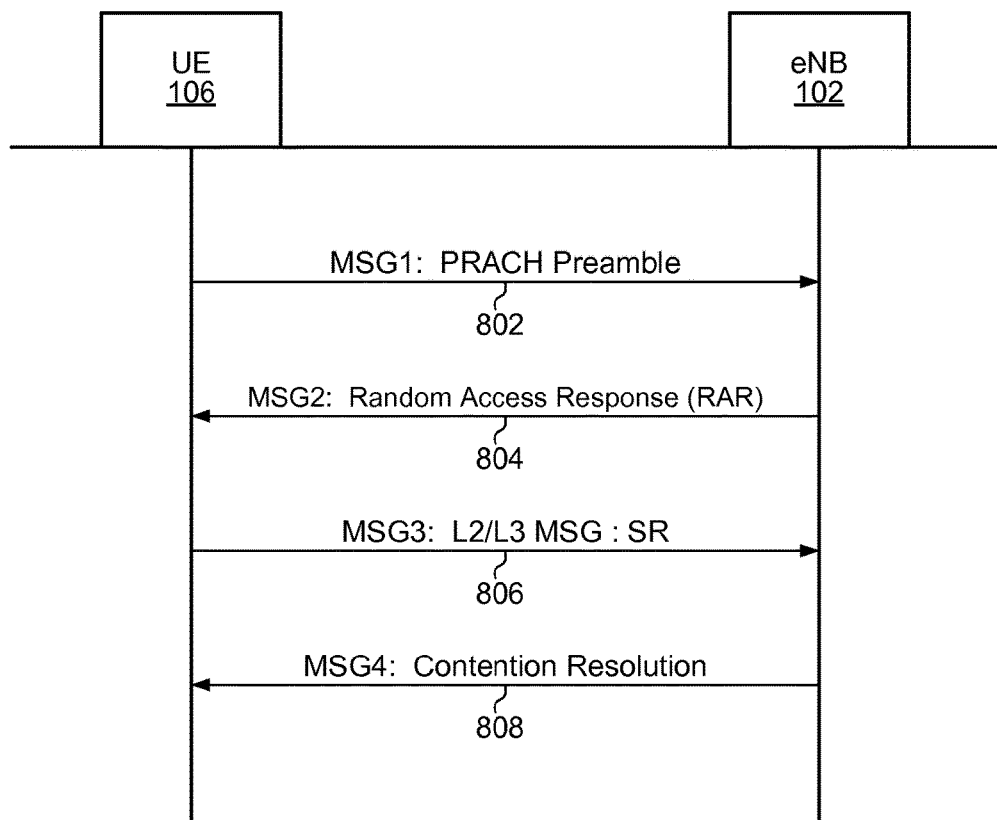
FIG. 8 illustrates a message flow of transmission of scheduling request using a RACH message, according to some embodiments.

FIG. 8 illustrates a random access procedure (RACH), according to some embodiments. When the UE 106 needs to send a scheduling request (in order to request an uplink grant from the eNB 102), the UE sends the scheduling request as part of a random access procedure (RACH). Because the RACH can be made very robust, the RACH is a more reliable mechanism for transmission of the scheduling request than the PUCCH.

In one implementation, the scheduling request (SR) may be included in MSG3 of the RACH. MSG3 is carried by the Physical Uplink Shared Channel (PUSCH). The eNB may control the coding rate of the SR (or more generally, uplink control information) in the PUSCH to ensure that the scheduling request is successfully received and decoded by the eNB.

As shown in FIG. 8, when the UE desires to send an SR to the base station, the UE may initiate a random access procedure by sending MSG 1 (denoted 802) containing the PRACH Preamble. (PRACH is an acronym for physical random access channel.) In response to MSG1, the base station sends MSG2, which is referred to as the Random Access Response (RAR). (See item 804.) In response to the RAR, the UE sends MSG3, which comprises an L2/L3 MSG. (See item 806.) We propose transmitting the SR as part of MSG3. After receiving MSG3, the base station transmits MSG4, which may be a contention resolution message. (See item 808.)

In response to receiving the SR in MSG3, the base station may generate an uplink grant for the UE, and transmit the uplink grant, e.g., as part of MSG4, or after the RACH is completed.

Uplink Grants in Response to Link-Budget-Limited Status of UE

Figure 9A:
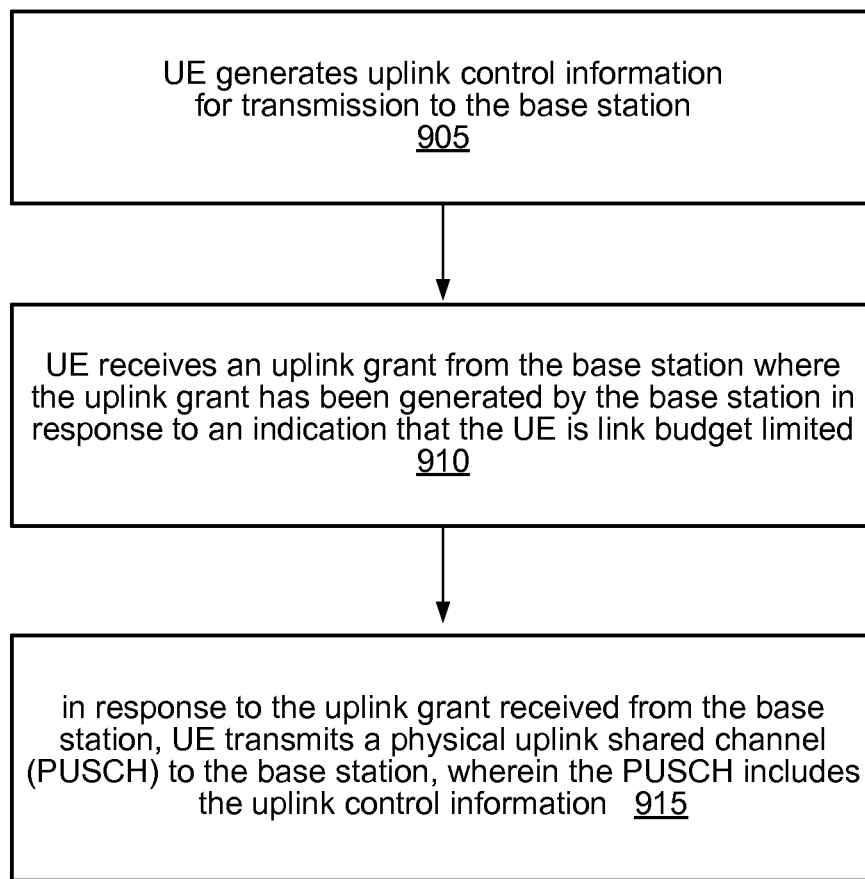
FIG. 9A illustrates a method for operating a UE device to enable improved uplink transmission of uplink control information on the PUSCH, according to some embodiments.

In one set of embodiments, a method 900 for operating a user equipment (UE) may include the operations shown in FIG. 9A. (The method 900 may also include any subset of the features, elements and embodiments described above in connection with FIGS. 1-8 and described below in connection with FIGS. 9B-12.) The method 900 may be performed to enable the UE to transmit uplink control information with improved reliability on the PUSCH. Except where dependencies are noted, the steps described below may occur in different orders than that shown, or concurrently. Further, various steps shown may be omitted, or other steps added, in various embodiments.

As shown at 905, the UE may generate uplink control information for transmission to a base station. This uplink control information may be any of various types of control information, such as channel state information (CSI), HARQ Acknowledge or Negative Acknowledge (ACK/NACK), or possibly other types of control information.

As shown at 910, the UE may receive an uplink grant from the base station, where the uplink grant has been generated by the base station in response to an indication that the UE is link budget limited. (In some embodiments, the base station may generate the uplink grant in response to a logical combination of two or more conditions including the condition that the UE is link budget limited. The two or more conditions may also include, e.g., a condition that downlink traffic data is available for transmission, or the condition that a controller of the base station has decided to configure the UE for CSI feedback.) The uplink grant may identify uplink resources in the PUSCH, i.e., PUSCH resources to be used by the UE for transmission of uplink control information. This type of uplink grant, generated in response to an indication that the UE is link budget limited (LBL), may be referred to herein as an "LBL-related uplink grant".

In some embodiments, the UE is configured so that it uses the PUSCH resources identified by the uplink grant to convey only uplink control information, not uplink traffic data. In these embodiments, when a UE has traffic data available to be transmitted, the UE may send a request for an uplink grant to the base station. Such as request may be referred to herein as a traffic-induced request, and corresponding uplink grant may be referred to as a traffic-induced uplink grant. The UE may send traffic data to the base station on the PUSCH resources identified by the traffic-induced uplink grant. The UE may also send uplink control data (if available) on the PUSCH resources identified by the traffic-induced uplink grant.

In other embodiments, the UE is configured so that it uses the PUSCH resources identified by the uplink grant to convey uplink traffic data (when available) in addition to the uplink control information. In these embodiments, the UE is configured to adapt the coding rate of the uplink control information depending on the amount of PUSCH resources are allowed for uplink control information versus uplink traffic data.

The link-budget-limited status of the UE may be signaled to the base station by the UE. Alternatively, the base station may itself determine that the UE is link budget limited, e.g., based on measurements on uplink signals transmitted by the UE.

As shown at 915, in response to the uplink grant received from the base station, the UE transmits a physical uplink shared channel (PUSCH) to the base station, where the PUSCH includes the uplink control information. (In a broader context, the UE transmits an uplink signal including the PUSCH.) The UE transmits uplink control information in the granted PUSCH resources even when the UE does not have any payload data to transmit to the base station.

In some embodiments, prior to the action of receiving the uplink grant, the UE transmits a message to the base station indicating that the UE is link budget limited. (The UE may determine that it is link budget limited in any of various ways, such as based on channel state information generated by the UE, based on measurements of downlink signal strength, based on measurements of signal-to-noise ratio or signal to noise-and-interference ratio of the downlink signal, based on number of HARQ retransmissions, based on information indicating a hardware limitation of the UE, etc.) The base station may be configured to generate (and transmit) the uplink grant to the UE in response to the message. The uplink grant may be transmitted in a Physical Downlink Control Channel (PDCCH) or an e-PDCCH of the downlink signal.

In some embodiments, the action of transmitting the above-described message occurs when the UE does not have any payload data to transmit on the PUSCH.

In some embodiments, the base station is configured to send a sequence of uplink grants to the UE in response to the above-described message. The uplink grant received in step 910 may be one of the uplink grants of said sequence.

In some embodiments, the uplink control information comprises channel state information (CSI).

In some embodiments, the UE is configured to not transmit uplink traffic data in the PUSCH of step 915, i.e., the PUSCH that is transmitted in response to the uplink grant. This feature may allow for the uplink control information to be encoded with a lower coding rate than if the uplink control information were to share the granted PUSCH resources with uplink traffic data.

In some embodiments, the uplink control information comprises a HARQ acknowledgement message or a HARQ negative acknowledgement message.

In some embodiments, the operation 910 of receiving the uplink grant from the base station comprises receiving the uplink grant a predetermined amount of time after receipt of a downlink traffic transmission to the UE from the base station.

In some embodiments, the uplink grant comprises a persistent uplink grant, where the persistent uplink grant lasts for a predetermined period of time or until cancelled. In these embodiments, the action 905 (of generating uplink control information) and the action 915 (of transmitting a PUSCH that includes the uplink control information) are performed a plurality of times utilizing the persistent uplink grant.

In some embodiments, the coding rate of the channel coding applied to the uplink control information (prior to inclusion in the PUSCH) is determined by coding rate information transmitted by the base station. The coding rate information may identify a coding rate sufficient to ensure successful decoding of the uplink control information contained in the PUSCH.

In some embodiments, the coding rate of at least a portion of the uplink control information in the PUSCH is lower than a conventional coding rate defined for a periodic CSI transmitted on the PUSCH in response to conventional uplink grants.

As described above, the UE may transmit a message (to the base station) indicating that the UE is link budget limited. The message may take any of various forms, as desired. The message may be considered as a request that the base station send an uplink grant (to the UE) specifically for the purpose of allowing the UE to transmit uplink control information on a physical uplink shared channel (PUSCH). Thus, in some embodiments, this message essentially configures the base station to generate an uplink grant to specifically enable the UE to transmit uplink control information on the PUSCH, even when the UE does not have any uplink traffic information to transmit.

Figure 9B:
FIG. 9B illustrates a method for operating a base station to enable improved uplink transmission of uplink control information on the PUSCH, according to some embodiments.

In one set of embodiments, a method 950 for operating a base station may include the operations shown in FIG. 9B. (The method 950 may also include any subset of the features, elements and embodiments described above in connection with FIGS. 1-9A and described below in connection with FIGS. 10-12.) The method 950 may be performed by a base station, to enable a UE to transmit uplink control information with improved reliability on the PUSCH. The method 950 may be performed by a processing element of the base station, wherein the processing element is coupled to one or more radios, e.g., as variously described above.

Except where dependencies are noted, the steps described below may occur in different orders than that shown, or concurrently. Further, various steps shown may be omitted, or other steps added, in various embodiments.

At 955, the base station may transmit an uplink grant to a user equipment (UE). The uplink grant may be transmitted in response to an indication that the UE is link budget limited. The UE may be configured to transmit uplink control information on a physical uplink shared channel (PUSCH) in response to the uplink grant (i.e., in response to receiving the uplink grant). The uplink grant identifies PUSCH resources that are granted to the UE.

At 960, the base station may receive the uplink control information on the PUSCH. In other words, the base station receives an uplink signal transmitted by the UE, where the uplink signal includes the PUSCH, and the uplink control information is contained within the PUSCH. The uplink control information may include control information such as CSI, ACK/NACK feedback, etc. CSI may include CQI(s) and/or PMI(s) and/or RI(s).

CQI is an acronym for Channel Quality Indicator.

PMI is an acronym for Precoding Matrix Indicator.

RI is an acronym for Rank Indicator.

In some embodiments, the uplink signal is a Single-Carrier Frequency Division Multiple Access (SC-FDMA) signal. However, any of a wide variety of other modulation and multiple access techniques may be employed for the uplink transmission from UE.

The UE preferably applies channel coding to the uplink control information prior to embedding the uplink control information in the PUSCH. Thus, the base station extracts encoded data corresponding to the uplink control information from the PUSCH. The base station decodes the encoded data to recover the original payload of the uplink control information. Techniques for decoding channel-encoded data are well known in the field of wireless communication.

The uplink control information may be used by the base station for any of a variety of purposes, e.g., to inform the scheduling of uplink and/or downlink resources for the UE, to select a number of layers for MIMO transmission to the UE, to select a number or subsets of antennas to be used for communication with the UE, to control the power of transmissions to and/or from the UE, to select a precoding matrix to be used for downlink transmission to the UE, to select an uplink combining matrix to be used for combining signals captured by the base station's receiver antennas, etc.

In some embodiments, prior to said transmitting the uplink grant, the base station may receive a message from the UE indicating that the UE is link budget limited. The above-described action of transmitting the uplink grant may occur in response to receiving this message from the UE.

In some embodiments, the uplink control information includes a HARQ acknowledgement (ACK) or a HARQ negative acknowledgement (NACK).

In some embodiments, the uplink control information comprises channel state information (CSI), e.g., as variously described above.

In some embodiments, the uplink grant comprises a persistent uplink grant, wherein the persistent uplink grant lasts for a predetermined period of time or until cancelled. In these embodiments, the base station may receive additional uplink control information from one or more additional instances of the PUSCH transmitted from the UE. The UE may be configured to transmit the one or more additional instances of the PUSCH based on the persistent uplink grant, i.e., based on PUSCH resources identified by the persistent uplink grant.

In some embodiments, the base station may signal a coding rate to be used by the UE for transmission of the uplink control information in the PUSCH. The signaled coding rate may be selected to ensure successful receipt of the uplink control information by the base station.

In some embodiments, the base station may decode the uplink control information without a priori knowledge of the coding rate used by the UE to encode the uplink control information. The base station may attempt decoding of the uplink control information with different coding rates (e.g., coding rates selected from a predetermined set of possible value) until the correct coding rate is discovered.

Uplink Grants Enabling Uplink Control Information via PUSCH

In one embodiment, a base station may be configured to send uplink grants to the UE at specific (or predetermined) times, or in response to specific conditions, e.g., when the base station requires channel state information (CSI) from the UE. The uplink grant may enable the UE to transmit CSI (or other uplink control information) via the PUSCH.

In one embodiment, the base station may be configured to send an uplink grant to the UE a predetermined amount of time after a downlink transmission to the UE. This enables the UE to send an ACK/NACK back to the base station on the PUSCH based on the uplink grant. The ACK/NACK may positively or negatively acknowledge the downlink transmission.

Transmission of CSI over the PUSCH

According to current LTE specifications, the PUCCH carries periodic CSI feedback from the UE. A periodic CSI feedback can be carried on the PUSCH if an uplink grant is available. (The a periodic CSI is multiplexed in the PUSCH with uplink traffic data.) Transmission of the CSI over PUSCH provides for improved likelihood of successful CSI decoding since the PUSCH has more bits and hence more precision. Since most traffic between the base station and UE is symmetric (i.e., transmission on the UL and DL is often symmetric), it is likely that the UE will have an uplink grant available to transmit CSI when needed. In one embodiment, when the base station has not recently received CSI from the UE, the base station may provide an uplink grant to the UE for the purpose of enabling the UE to provide the CSI on the PUSCH. For example, the base station may generate and transmit an uplink grant for the UE if the time since the last CSI report for the UE exceeds a predetermined threshold.

Transmission of ACK/NACK over PUSCH

For applications such as Voice over LTE (VoLTE) that are real time, periodic and low data rate, HARQ (hybrid automatic repeat request) may be disabled, in which case feedback of ACK/NACK is not needed.

For symmetric traffic between the base station and UE, the time between successive PUSCH grants (transmitted by the base station) is relatively small. Thus, if the UE has an ACK/NACK to be transmitted, it need not wait long for a PUSCH grant to become available (if one is not already available). Thus, an ACK/NACK can be transmitted on the PUSCH without an excessive delay from the time of downlink transmission (i.e., the downlink transmission being positively or negatively acknowledged).

For other types of traffic, PUSCH grants might not occur with sufficient frequency or regularity for immediate ACK/NACK feedback. Thus, the timing requirement on ACK/NACK feedback may be relaxed. For example, the UE may be allowed to send the ACK/NACK more than 4ms after receipt of the downlink transmission in order to provide enough time for the base station (eNB) to provide an uplink grant (PUSCH), enabling the UE to carry the ACK/NACK information in the PUSCH.

In another embodiment involving asymmetric traffic, a persistent uplink grant may be provided by the base station (to the UE). The persistent uplink grant acts as a grant for a plurality of future uplink transmissions from the UE on respective instances of the PUSCH. A persistent uplink grant may remain in effect for a set period of time or until cancelled by the base station or the UE. The persistent uplink grant may be provided so that, every time there is a DL transmission, the UE already has access to the persistently granted resources, thus enabling timely transmission of the ACK/NACK on the PUSCH. The persistently granted resources may thus be used to carry ACK/NACK information, and/or, may possibly be used to carry other types of uplink control information, such as CSI and/or scheduling requests. (In some embodiments, the persistently granted resources are used only to carry ACK/NACK information.) If the persistent uplink grant is set to expire after a set period of time, the base station may renew it upon expiration, as desired. As another alternative, the UE may request a new persistent uplink grant upon expiration of a previous persistent grant. In some embodiments, when the UE is no longer link budget limited, either the UE or the base station may cancel the persistent uplink grant.

As another alternative, every time the base station (eNB) sends a downlink traffic transmission to the UE, the base station may send an uplink grant (to the UE) in the PDCCH (or an e-PDCCH). The UE can then use the PUSCH resources identified by this uplink grant for sending ACK/NACK to the base station over the PUSCH. The ACK/NACK positively or negatively acknowledges the downlink traffic transmission.

In some embodiments, the base station sends a persistent uplink grant to the UE each time the base station transmits a downlink transmission to the UE. The ACK/NACK can then be fed back to the base station on the PUSCH based on the persistent uplink grant.

Dynamically Adjustable Channel Coding

In one set of embodiments, the current LTE specifications regarding the PUSCH may be extended by allowing configurable (e.g., dynamically adjustable) coding rates for the uplink control information transmitted in the PUSCH by the UE. The UE and/or the base station may configure the PUSCH generation process to use a lower coding rate (or any of a plurality of lower coding rates) for the uplink control information than the fixed coding rate defined for a periodic CSI by existing LTE specifications. Thus, these embodiments may provide a larger link budget than would be allowed by the conventional transmission of a periodic CSI on the PUSCH using the conventionally-defined fixed coding rate.

Figure 10:
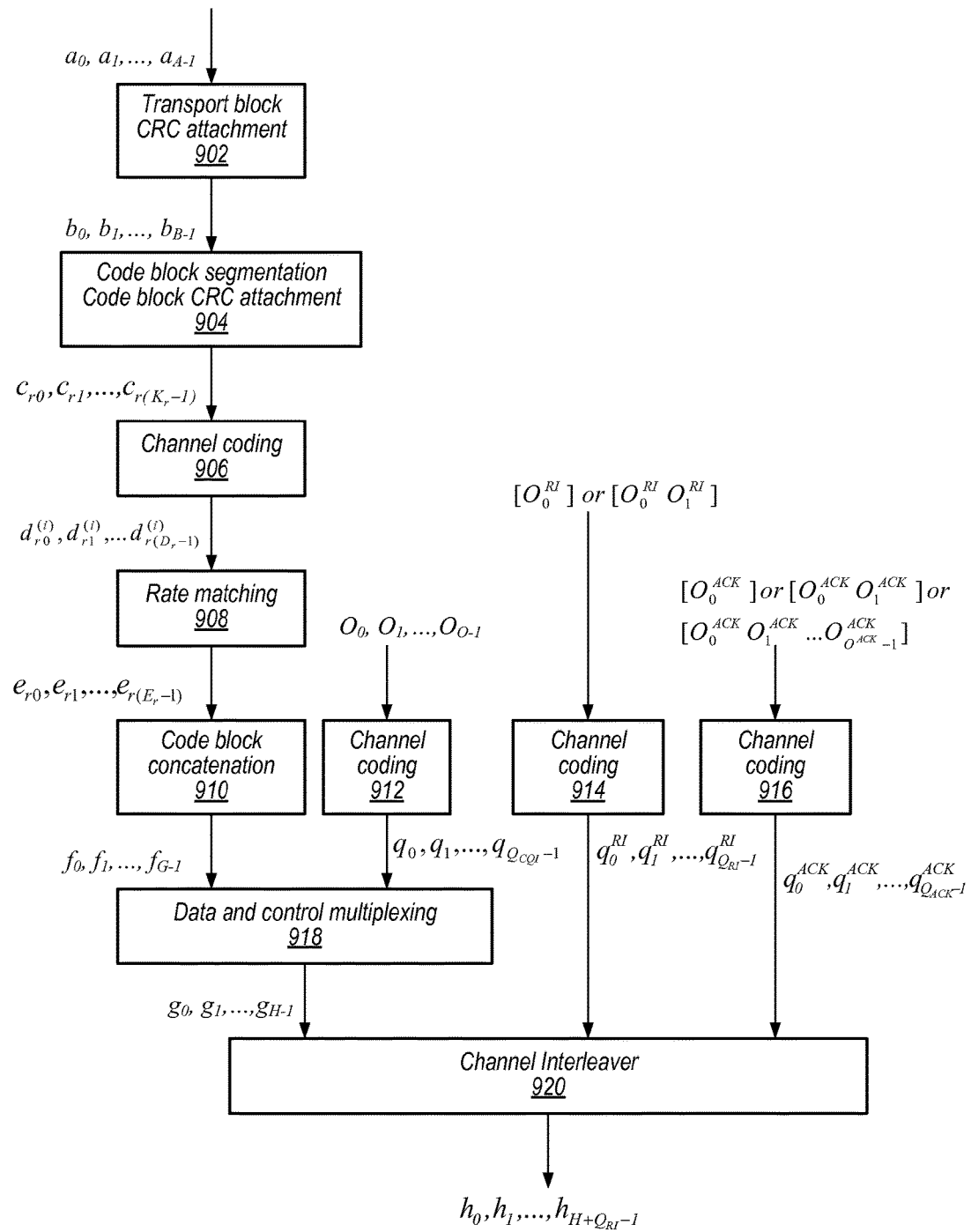
FIG. 10 illustrates an example of transmission logic in the UE, according to some embodiments.

FIG. 10 illustrates PUSCH generation logic that may be included in the UE, according to some embodiments. As shown, the PUSCH generation logic may comprise:

unit 902 for transport block CRC attachment, which receives data $a_0, \ldots, a_{A-1}$ and generates data $b_0, b_1, \ldots, b_{B-1}$;

unit 904 for code block segmentation/code block CRC attachment, which receives data $b_0, b_1, \ldots, b_{B-1}$ and generates data $c_{r0}, c_{r1}, \ldots, c_{r(Kr-1)}$;

channel coding unit 906, which receives data $c_{r0}, c_{r1}, \ldots, c_{r(Kr-1)}$ and generates data $d^{(i)}_{r0}, d^{(i)}_{r1}, \ldots, d^{(i)}_{r(Dr-1)}$;

rate matching unit 908, which receives data $d^{(i)}_{r0}, d^{(i)}_{r1}, \ldots, d^{(i)}_{r(Dr-1)}$ and generates data $e_{r0}, e_{r1}, \ldots, e_{r(Er-1)}$; and code block concatenation unit 910, which receives data $e_{r0}, e_{r1}, \ldots, e_{r(Er-1)}$ and generates data $f_0, f_1, \ldots, f_{G-1}$.

The units 902 through 910 may be coupled in series as shown. In some embodiments, units 902 through 910 may operate as defined in existing LTE specifications.

The code block concatenation unit 910 provides data $f_0, f_1, \ldots, f_{G-1}$ to unit 918 for data and control multiplexing. Channel coding unit 912 also provides encoded data $q_0, q_1, \ldots, q_{QCQI-1}$ to unit 918. Unit 918 provides output $g_0, g_1, \ldots, g_{H-1}$ to channel interleaver 920. Channel coding unit 914 and channel coding unit 916 also provide their respective outputs $q^{RI}_0, q^{RI}_1, \ldots, q^{RI}_{QRI-1}$ and $q^{ACK}_0, q^{ACK}_1, \ldots, q^{ACK}_{QACK-1}$ to channel interleaver 920.

The channel coding unit 912 may perform channel coding on CSI (or CQI) data $O_0, O_1, \ldots, O_{O-1}$ to generate the encoded data $q_0, q_1, \ldots, q_{QCQI-1}$, and may be dynamically configurable by the UE to adjust the channel coding (or the channel coding rate) of the CSI data to ensure reliable transmission of the CSI to the base station. The encoded data $q_0, q_1, \ldots, q_{QCQI-1}$ is provided to unit 918.

The channel coding unit 914 may perform channel coding on rank indication (RI) data, e.g., RI data of the form $[O^{RI}_0]$ or $[O^{RI}_0\ O^{RI}_1]$, in order to generate encoded data $q^{RI}_0, q^{RI}_1, \ldots, q^{RI}_{QRI-1}$, and may be dynamically configurable by the UE to adjust the channel coding (or channel coding rate) of the RI data, to ensure reliable transmission of the RI data to the base station.

The channel coding unit 916 may perform channel coding on ACK/NACK data, e.g., ACK/NACK data of the form $[O^{ACK}_0]$ or $[O^{ACK}_0\ O^{ACK}_1]$ or $[O^{ACK}_0\ O^{ACK}_1, \ldots, O^{ACK}_{OACK-1}]$, in order to generate encoded data $q^{ACK}_0, q^{ACK}_1, \ldots, q^{ACK}_{QACK-1}$, and may be dynamically configurable by the UE to adjust the channel coding (or the channel coding rate) of the ACK/NACK data, to ensure reliable transmission of the ACK/NACK data to the base station.

The UE may adjust the channel coding rate of each of the coding units 912, 914 and 916, e.g., based on whether the UE is link budget limited or not, based on the quality of the channel between the base station and the UE, based on rate configuration information signaled by the base station, etc. For example, the UE may use lower coding rate when the channel is more noisy or when the downlink signal is weaker.

Uplink Grant Initiated by Downlink Traffic

In one set of embodiments, a method 1100 for operating a base station may performed as shown in FIG. 11. (The method 1100 may also include any subset of the features, elements and embodiments described above in connection with FIGS. 1-10 and described below in connection with FIG. 12.) The method 1100 may be performed by a processor or processing element as variously described above.

At 1110, in response to an indication that a UE is link budget limited, the base station may perform a set of operations including operations 1115 through 1130.

At 1115, in response to determining that the base station has downlink traffic data to be transmitted to the UE, the base station may generate an uplink grant for the UE. (For example, the base station may examine a downlink traffic buffer to determine if there is downlink traffic data to be transmitted.) The uplink grant may be generated to specifically enable the UE to transmit uplink control information on the PUSCH instead on the PUCCH. (The PUCCH is an inferior mechanism for control information transmission when the UE is link budget limited.)

At 1120, the base station may transmit at least a portion of the downlink traffic data to the UE. For example, the downlink traffic data may be transmitted in the PDSCH of the downlink signal.

At 1125, the base station may transmit the uplink grant to the UE. The uplink grant may identify resources on the PUSCH, which resources are granted to the UE for uplink transmission.

At 1130, the base station may receive an uplink signal including a PUSCH from the UE. The PUSCH includes uplink control information. The uplink control information may be channel encoded information as variously described above. In some embodiments, the uplink control information includes an ACK/NACK for said at least a portion of the downlink traffic data. The ACK/NACK may positively or negatively acknowledge receipt (by the UE) of said at least a portion of the downlink traffic data.

In some embodiments, the uplink grant is a persistent uplink grant or a semi-persistent uplink grant. Thus, the UE is guaranteed to have available resources on the PUSCH for transmission of ACK/NACKs in response to future downlink traffic transmissions.

In some embodiments, the uplink grant is transmitted a predetermined amount of time after the transmission of the at least a portion of the downlink traffic data.

In some embodiments, a downlink assignment (i.e., an assignment of downlink transmission resources) for said at least a portion of the downlink traffic is transmitted in the PDCCH (or e-PDCCH) of a given subframe, and the uplink grant is transmitted in the PDCCH (or e-PDCCH) of the same subframe or a later subframe.

If a UE is not link budget limited, the base station may be configured to use conventional mechanisms for receiving uplink control information from the UE.

In one set of embodiments, a method 1200 for operating a user equipment (UE) device may include the operations shown in FIG. 12. (The method 1200 may also include any subset of the features, elements and embodiments described above in connection with FIGS. 1-11.)

At 1210, the UE performs a set of operations including operations 1215 through 1225 to be described below. A base station is configured to generate an uplink grant for the UE in response to (a) an indication that the UE is link budget limited and (b) an indication that the base station has downlink traffic data to be transmitted to the UE.

At 1215, the UE receive at least a portion of the downlink traffic data from the base station.

At 1220, the UE receives the uplink grant from the base station.

At 1225, in response to receiving the uplink grant, the UE transmits a physical uplink shared channel (PUSCH) to the base station, wherein the PUSCH includes uplink control information.

In some embodiments, the uplink control information includes ACK/NACK for said at least a portion of the downlink traffic data. The ACK/NACK positively or negatively acknowledged receipt of said at least a portion of the downlink traffic data.

In some embodiments, the uplink grant is a persistent uplink grant or a semi-persistent uplink grant. Thus, the UE is guaranteed to have granted PUSCH resources for transmission of ACK/NACKs in response to future traffic data transmissions from the base station.

In some embodiments, the uplink grant is received a predetermined amount of time after said reception of said at least a portion of the downlink traffic data.

In some embodiments, a downlink assignment for said at least a portion of the downlink traffic data is received from a PDCCH (or e-PDCCH) of a given downlink subframe, wherein said uplink grant is received from the PDCCH (or e-PDCCH) of the same downlink subframe or a later downlink subframe.

Advantages

In various embodiments described herein, the UE uses the PUSCH to carry at least a portion or all of the uplink control information (UCI). Thus, the UCI is not limited to a single resource block (RB) per slot as when UCI is transmitted in the PUCCH. Also, channel coding may be used when transmitting UCI on the PUSCH, whereas channel coding may not be available on the PUCCH. Thus, a better link budget can be achieved using the PUSCH (for UCI transmission) than if the PUCCH were used. Furthermore, the UE may be configured to use a lower coding rate for encoding the UCI (or portions of the UCI) than the fixed coding rate defined by existing LTE specifications for a periodic CSI reports on the PUSCH.

Various Additional Embodiments

In one set of embodiments, a method for providing improved uplink performance in a cellular communication system may include the following operations.

The method may include performing operations by a user equipment (UE), wherein the operations include: (a) generating uplink control information for transmission to a base station; (b) receiving a first uplink grant from the base station, wherein the first uplink grant has been generated by the base station in response to an indication that the UE is link budget limited; and (c) in response to the first uplink grant received from the base station, transmitting a physical uplink shared channel (PUSCH) to the base station, wherein the PUSCH includes the uplink control information.

In some embodiments, the operations also include: prior to the action of receiving the first uplink grant, transmitting a message to the base station indicating that the UE is link budget limited.

In some embodiments, the action of transmitting the message to the base station occurs when the UE does not have any payload data to transmit on the PUSCH.

In some embodiments, the base station is configured to send a sequence of uplink grants to the UE in response to said message, wherein said first uplink grant is one of the uplink grants of said sequence.

In some embodiments, the uplink control information comprises channel state information (CSI).

In some embodiments, the UE is configured to not transmit uplink traffic data in said PUSCH that is transmitted in response to said first uplink grant.

In some embodiments, the uplink control information comprises a HARQ acknowledgement message or a HARQ negative acknowledgement message.

In some embodiments, the action of receiving the first uplink grant from the base station comprises receiving the first uplink grant a predetermined amount of time after receipt of a downlink transmission of downlink traffic data to the UE from the base station.

In some embodiments, the first uplink grant comprises a persistent uplink grant, wherein the persistent uplink grant lasts for a predetermined period of time or until cancelled, wherein said generating the uplink control information and said transmitting the PUSCH that includes the uplink control information are performed a plurality of times utilizing the persistent uplink grant.

In some embodiments, a coding rate of the uplink control information in the PUSCH is determined by coding rate information transmitted by the base station, wherein the coding rate information identifies the coding rate in order to ensure successful decoding of the uplink control information contained in the PUSCH.

In some embodiments, a coding rate of at least a portion of the uplink control information in the PUSCH is lower than a coding rate allowed for PUSCH-embedded control information transmitted in response to conventional uplink grants.

In one set of embodiments, a user equipment (UE) device may comprise at least one antenna, at least one radio, and one or more processors coupled to the at least one radio.

The at least one radio may be configured to communicate with a base station using at least one cellular radio access technology (RAT).

The one or more processors and the at least one radio may be configured to: (a) transmit a message to the base station indicating that the UE is link budget limited, wherein the base station is configured to send a first uplink grant to the UE in response to said message; (b) generate uplink control information for transmission to the base station; (c) receive the first uplink grant from the base station; and (d) in response to the first uplink grant received from the base station, transmit a physical uplink shared channel (PUSCH) to the base station, wherein the PUSCH includes the uplink control information.

In some embodiments, the one or more processors and the at least one radio are further configured to: prior to said receiving the first uplink grant, transmitting a message to the base station indicating that the UE device is link budget limited.

In some embodiments, the one or more processors and the at least one radio are further configured so that said transmitting the message to the base station occurs when the UE device does not have any payload data to transmit.

In some embodiments, the base station is configured to send a sequence of uplink grants to the UE device in response to said message, wherein said first uplink grant is one of the uplink grants of said sequence.

In some embodiments, the uplink control information comprises channel state information (CSI).

In some embodiment, the one or more processors and the at least one radio are further configured to not transmit uplink traffic data in said PUSCH that is transmitted in response to said first uplink grant.

In some embodiments, the uplink control information comprises a HARQ acknowledgement message or a HARQ negative acknowledgement message.

In some embodiments, said receiving the first uplink grant from the base station comprises receiving the first uplink grant a predetermined amount of time after receipt of a downlink transmission of downlink traffic data to the UE device from the base station.

In some embodiments, the first uplink grant comprises a persistent uplink grant, wherein the persistent uplink grant lasts for a predetermined period of time or until cancelled, wherein said one or more processors and the at least one radio are configured so that said generating the uplink control information and said transmitting the PUSCH that includes the uplink control information are performed a plurality of times utilizing the persistent uplink grant.

In some embodiments, a coding rate of the uplink control information in the PUSCH is determined by coding rate information transmitted by the base station, wherein the coding rate information identifies the coding rate in order to ensure successful decoding of the uplink control information contained in the PUSCH.

In some embodiments, a coding rate of at least a portion of the uplink control information in the PUSCH is lower than a coding rate allowed for PUSCH-embedded control information transmitted in response to conventional uplink grants.

In one set of embodiments, a method for operating a base station may configured as follows. The method may include performing operations by a base station, wherein the operations include: (a) transmitting a first uplink grant to a user equipment (UE), wherein the first uplink grant is transmitted in response to an indication that the UE is link budget limited, wherein the UE is configured to transmit uplink control information on a physical uplink shared channel (PUSCH) in response to the first uplink grant; and (b) receiving the uplink control information on the PUSCH.

In some embodiments, the operations also includes: prior to said transmitting the first uplink grant, receiving a message from the UE indicating that the UE is link budget limited, wherein said transmitting the first uplink grant occurs in response to said receiving the message.

In some embodiments, the uplink control information includes a HARQ acknowledgement message or a HARQ negative acknowledgement message.

In some embodiments, the uplink control information comprises channel state information (CSI).

In some embodiments, the first uplink grant comprises a persistent uplink grant, wherein the persistent uplink grant lasts for a predetermined period of time or until cancelled, wherein the operations also include receiving additional uplink control information from one or more additional instances of the PUSCH transmitted from the UE, wherein the UE is configured to transmit the one or more additional instances of the PUSCH based on the persistent uplink grant.

In some embodiments, the operations also include: signaling a coding rate to be used by the UE for transmission of the uplink control information in the PUSCH, to ensure successful receipt of the uplink control information by the base station.

In one set of embodiments, a base station may be configured as follows to perform wireless communication with a wireless device. The base station may include a radio and a processing element operatively coupled to the radio.

The radio and the processing element may be configured to: (a) transmit a first uplink grant to a user equipment (UE), wherein the first uplink grant is transmitted in response to an indication that the UE is link budget limited, wherein the UE is configured to transmit uplink control information on a physical uplink shared channel (PUSCH) in response to the first uplink grant; and (b) receive the uplink control information on the PUSCH.

In some embodiments, the radio and the processing element may be further configured to: prior to said transmitting the first uplink grant, receive a message from the UE indicating that the UE is link budget limited, wherein said transmitting the first uplink grant occurs in response to said receiving the message.

In some embodiments, the uplink control information includes a HARQ acknowledgement message or a HARQ negative acknowledgement message.

In some embodiments, the uplink control information comprises channel state information (CSI).

In some embodiments, the first uplink grant comprises a persistent uplink grant, wherein the persistent uplink grant lasts for a predetermined period of time or until cancelled, wherein the radio and the processing element are further configured to: receive additional uplink control information from one or more additional instances of the PUSCH transmitted from the UE, wherein the UE is configured to transmit the one or more additional instances of the PUSCH based on the persistent uplink grant.

In some embodiments, the radio and the processing element are further configured to signal a coding rate to be used by the UE for transmission of the uplink control information on the PUSCH, to improve probability of successful decoding of the uplink control information.

In some embodiments, the radio and the processing element are further configured to control a coding rate of the uplink control information on the PUSCH to improve reliability of receipt of the uplink control information.

In one set of embodiments, a method for operating a base station may be configured as follows. In response to an indication that a UE is link budget limited, the base station may perform operations including: (a) in response to determining that the base station has downlink traffic data to be transmitted to the UE, generate an uplink grant for the UE; (b) transmitting at least a portion of the downlink traffic data to the UE; (c) transmitting the uplink grant to the UE; and (d) receiving an uplink signal including a PUSCH from the UE, wherein the PUSCH includes uplink control information.

In some embodiments, the uplink control information includes ACK/NACK for said at least a portion of the downlink traffic data.

In some embodiments, the uplink grant is a persistent uplink grant or a semi-persistent uplink grant.

In some embodiments, the uplink grant is transmitted a predetermined amount of time after said transmission of said at least a portion of the downlink traffic data.

In some embodiments, a downlink assignment for said at least a portion of the downlink traffic data is transmitted in a PDCCH (or e-PDCCH) of a given subframe, wherein said uplink grant is transmitted in the PDCCH (or e-PDCCH) of the same subframe or a later subframe.

In one set of embodiments, a method for operating a user equipment (UE) device may be configured as follows. The method may include performing a set of operations by the UE, wherein a base station is configured to generate an uplink grant for the UE in response to (a) an indication that the UE is link budget limited and (b) an indication that the base station has downlink traffic data to be transmitted to the UE. The set of operations performed by the UE may include: (a) receiving at least a portion of the downlink traffic data from the base station; (b) receiving the uplink grant from the base station; (c) in response to receiving the uplink grant, transmitting a physical uplink shared channel (PUSCH) to the base station, wherein the PUSCH includes uplink control information.

In some embodiments, the uplink control information may include ACK/NACK for said at least a portion of the downlink traffic data.

In some embodiments, the uplink grant is a persistent uplink grant or a semi-persistent uplink grant.

In some embodiments, the uplink grant is received a predetermined amount of time after said reception of said at least a portion of the downlink traffic data.

In some embodiments, a downlink assignment for said at least a portion of the downlink traffic data is received from a PDCCH (or an e-PDCCH) of a given downlink subframe, wherein said uplink grant is received from the PDCCH (or e-PDCCH) of the same downlink subframe or a later downlink subframe.

In one set of embodiments, a method for operating a user equipment (UE) may be configured as follows. The method may include performing operations by the UE, wherein the operations include: (a) generating a scheduling request for transmission to a base station, wherein the scheduling request represents a request for a scheduling of uplink resources for an uplink transmission by the UE; and (b) transmitting the scheduling request as part of a random access procedure.

In some embodiments, the scheduling request is transmitted in a third message (MSG3) of the random access procedure, wherein MSG3 is transmitted on a Physical Uplink Shared Channel (PUSCH) of an uplink signal.

In some embodiments, the scheduling request is transmitted in MSG3 with a coding rate that is determined by the base station to ensure successful decode of the scheduling request by the base station.

In some embodiments, the action of transmitting the scheduling request as part of the random access performed in response to a determination by the UE that the UE is link budget limited.

In some embodiments, the UE is link budget limited.

In one set of embodiments, a method for operating a base station may be configured as follows. The method may include performing operations by a base station, wherein the operations include: (a) receiving a scheduling request from a user equipment (UE) device, wherein said receiving the scheduling request includes receiving the scheduling request from a message of a random access procedure (RACH); (b) generating an uplink grant for the UE device in response to receiving the scheduling request; and (c) transmitting the uplink grant to the UE device.

In some embodiments, the RACH message is a third message (MSG3) of the RACH, wherein MSG3 is received from a Physical Uplink Shared Channel (PUSCH) of an uplink signal.

In some embodiments, the action of receiving the scheduling request comprises decoding the scheduling request from MSG3 according to a channel coding algorithm.

In some embodiments, the operations also include: prior to said RACH, receiving a status message from the UE, wherein the status message indicates that UE is link budget limited, wherein said receiving the scheduling request from the RACH message is performed in response said receiving the status message.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment (UE) device comprising:
at least one antenna;
at least one radio, wherein the at least one radio is configured to communicate with a base station using at least one cellular radio access technology (RAT); and
one or more processors coupled to the at least one radio, wherein the one or more processors and the at least one radio are configured to:
determine that the UE is link budget limited as a result of a hardware limitation of the UE;
based at least in part on the determination, transmit a message to the base station comprising an indication that the UE is link budget limited, wherein the base station is configured to send a first uplink grant to the UE in response to said indication, wherein the base station is configured to transmit first coding rate information in response to said indication, wherein the first coding rate information identifies a first coding rate sufficient to ensure successful decoding of first uplink control information in a physical uplink shared channel (PUSCH), wherein the PUSCH supports channel coding with a flexible coding rate, wherein the base station is configured to receive second uplink control information on a physical uplink control channel (PUCCH) using a defined coding rate in response to an indication that a UE is not link budget limited, wherein the PUCCH is encoded by using Zadoff-Chu sequences, wherein the first coding rate is lower than the defined coding rate;

generate the first uplink control information for transmission to the base station;

receive the first uplink grant from the base station, wherein the first uplink grant identifies uplink resources in the PUSCH for transmission of uplink control information;

apply channel coding to the first uplink control information, wherein the coding rate of the channel coding applied to the first uplink control information is the first coding rate identified by the first coding rate information transmitted by the base station; and in response to the first uplink grant received from the base station, transmit the first uplink control information to the base station in the PUSCH.

2. The UE device of claim 1, wherein said one or more processors and the at least one radio are further configured so that said transmitting the message to the base station occurs when the UE device does not have any payload data to transmit.

3. The UE device of claim 1, wherein the base station is configured to send a sequence of uplink grants to the UE device in response to said message, wherein said first uplink grant is one of the uplink grants of said sequence.

4. The UE device of claim 1, wherein the first uplink control information comprises channel state information (CSI).

5. The UE device of claim 1, wherein the one or more processors and the at least one radio are further configured to not transmit uplink traffic data in said PUSCH that is transmitted in response to said first uplink grant.

6. The UE device of claim 1, wherein the first uplink control information comprises a HARQ acknowledgement message or a HARQ negative acknowledgement message.

7. The UE device of claim 6, wherein said receiving the first uplink grant from the base station comprises receiving the first uplink grant a predetermined amount of time after receipt of a downlink transmission of downlink traffic data to the UE device from the base station.

8. The UE device of claim 1, wherein the first uplink grant comprises a persistent uplink grant, wherein the persistent uplink grant lasts for a predetermined period of time or until cancelled, wherein said one or more processors and the at least one radio are configured so that said generating the first uplink control information and said transmitting the PUSCH that includes the first uplink control information are performed a plurality of times utilizing the persistent uplink grant.

9. The UE device of claim 1, wherein the one or more processors and the at least one radio are further configured to transmit uplink traffic data in the PUSCH that is transmitted in response to said first uplink grant.

10. A method for operating a user equipment (UE) device, the method comprising:

determining that the UE is link budget limited;

based at least in part on said determining, transmitting a message to the base station comprising an indication that the UE is link budget limited, wherein the base station is configured to send an uplink grant to the UE in response to said indication, wherein the base station is configured to transmit first coding rate information in response to said indication, wherein the first coding rate information identifies a first coding rate sufficient to ensure successful decoding of first uplink control information in a physical uplink shared channel (PUSCH), wherein the PUSCH supports channel coding with a flexible coding rate, wherein the base station is configured to receive second uplink control information on a physical uplink control channel (PUCCH) using a defined coding rate in response to an indication that a UE is not link budget limited, wherein the PUCCH is encoded by using Zadoff-Chu sequences, wherein the first coding rate is lower than the defined coding rate;

generating the first uplink control information for transmission to the base station;

receiving the uplink grant from the base station, wherein the uplink grant identifies uplink resources in the PUSCH for transmission of uplink control information;

applying channel coding to the first uplink control information, wherein the coding rate of the channel coding applied to the uplink control information is the first coding rate identified by the coding rate information transmitted by the base station;

in response to the uplink grant received from the base station, transmitting the first uplink control information on the uplink resources in the PUSCH to the base station.

11. The method of claim 10, further comprising:
receiving downlink traffic data.

12. The method of claim 11, wherein the uplink grant is received a predetermined amount of time after said reception of the downlink traffic data.

13. The method of claim 11, wherein a downlink assignment for said at least a portion of the downlink traffic data is received from a physical downlink control channel (PDCCH) of a given downlink subframe, wherein said uplink grant is received from the PDCCH of the same downlink subframe or a later downlink subframe.

14. The method of claim 11, wherein the first uplink control information includes ACK/NACK for at least a portion of the downlink traffic data.

15. The method of claim 10, wherein the uplink grant is a persistent uplink grant or a semi-persistent uplink grant.

16. The method of claim 10, wherein a downlink assignment for said at least a portion of the downlink traffic data is received from a PDCCH of a given downlink subframe, wherein said uplink grant is received from the PDCCH of the same downlink subframe or a later downlink subframe.

17. An apparatus for operating a user equipment device (UE), the apparatus comprising a hardware processing element configured to cause the UE to:

determine that the UE is link budget limited as a result of a hardware limitation of the UE;

based at least in part on the determination, transmit a message to the base station comprising an indication that the UE is link budget limited, wherein the base station is configured to send a first uplink grant to the UE in response to said indication, wherein the base station is configured to transmit first coding rate information in response to said indication, wherein the first coding rate information identifies a first coding rate sufficient to ensure successful decoding of first uplink control information on a physical uplink shared channel (PUSCH), wherein the PUSCH supports channel coding with a flexible coding rate, wherein the base station is configured to receive second uplink control information on a physical uplink control channel (PUCCH)

using a defined coding rate in response to an indication that a UE is not link budget limited, wherein the PUCCH is encoded by using Zadoff-Chu sequences, wherein the first coding rate is lower than the defined coding rate;

generate the first uplink control information for transmission to the base station;

receive the first uplink grant from the base station, wherein the uplink grant identifies uplink resources on the PUSCH for transmission of uplink control information;

apply channel coding to the first uplink control information, wherein the coding rate of the channel coding applied to the first uplink control information is the first coding rate identified by the coding rate information transmitted by the base station;

in response to the first uplink grant received from the base station, transmit the first uplink control information on the uplink resources in the PUSCH to the base station.

18. The apparatus of claim 17, wherein said transmitting the message to the base station occurs when the UE device does not have any payload data to transmit.

19. The apparatus of claim 17, wherein the base station is configured to send a sequence of uplink grants to the UE device in response to said message, wherein said first uplink grant is one of the uplink grants of said sequence.

20. The apparatus of claim 17, wherein the first uplink control information comprises channel state information (CSI).

21. The apparatus of claim 17, wherein the one or more processors and the at least one radio are further configured to not transmit uplink traffic data in said PUSCH that is transmitted in response to said first uplink grant.

22. The apparatus of claim 17, wherein the first uplink control information comprises a HARQ acknowledgement message or a HARQ negative acknowledgement message.

23. A base station configured to perform wireless communication with a wireless device, the base station comprising:
a radio; and
a processing element operatively coupled to the radio, wherein the radio and the processing element are configured to:
receive a first message comprising a first indication that a user equipment device (UE) is link budget limited, wherein the UE is configured to transmit the first message in response to a determination that the UE is link budget limited as a result of a hardware limitation of the UE;
send a first uplink grant to the UE in response to the first message, wherein the first uplink grant identifies uplink resources in a physical uplink shared channel (PUSCH) for transmission of first uplink control information;
transmit first coding rate information to the UE in response to the first message, wherein the first coding rate information identifies a first coding rate sufficient to ensure successful decoding of first uplink control information in the PUSCH, wherein the PUSCH supports channel coding with a flexible coding rate, wherein the radio and the processing element are configured to receive second uplink control information on a physical uplink control channel (PUCCH) using a defined coding rate in response to an indication that a UE is not link budget limited, wherein the PUCCH is encoded by using Zadoff-Chu sequences, wherein the first coding rate is lower than the defined coding rate; and
receive the first uplink control information from the UE, wherein the first uplink control information is received in the PUSCH, wherein the first uplink control information is channel coded by the UE, wherein the coding rate of the channel coding applied to the first uplink control information is the first coding rate identified by the first coding rate information.

24. The base station of claim 23, wherein the first uplink control information includes a HARQ acknowledgement message or a HARQ negative acknowledgement message.

25. The base station of claim 23, wherein the first uplink control information comprises channel state information (CSI).

26. The base station of claim 23, wherein the first uplink grant comprises a persistent uplink grant, wherein the persistent uplink grant lasts for a predetermined period of time or until cancelled, wherein the radio and the processing element are further configured to:
receive additional uplink control information from one or more additional instances of the PUSCH transmitted from the first UE, wherein the first UE is configured to transmit the one or more additional instances of the PUSCH based on the persistent uplink grant.

* * * * *